United States Patent [19]
Ozeki et al.

[11] Patent Number: 6,080,469
[45] Date of Patent: Jun. 27, 2000

[54] LAMINATED FOAM SHEET FOR VEHICLE INTERIOR AND A VEHICLE INTERIOR THEREOF

[75] Inventors: Syuya Ozeki; Kiyoyuki Namura, both of Osaka, Japan

[73] Assignee: Kaneka Corporation, Osaka, Japan

[21] Appl. No.: 09/099,393

[22] Filed: Jun. 18, 1998

[51] Int. Cl.$^7$ ........................................ B32B 3/26
[52] U.S. Cl. ................. 428/213; 296/214; 296/901; 428/317.1; 428/318.6; 428/319.3
[58] Field of Search ................... 428/213, 215, 428/317.1, 318.6, 319.3; 296/214, 901

[56] References Cited

FOREIGN PATENT DOCUMENTS 0 781 647 A1   7/1997   European Pat. Off. .......... B32B 5/18

*Primary Examiner*—Blaine Copenheaver
*Attorney, Agent, or Firm*—Arent Fox Kintner Plotkin & Kahn, PLLC

[57] ABSTRACT

The present invention is related to a laminated foam sheet for vehicle interior comprising a foamed core layer, a film layer(P) laminated on one side of said foamed core layer, and a film layer(S) laminated on the other side of said foamed core layer;

said foamed core layer comprising a modified polyphenylene ether resin(I), said film layer(P) comprising a modified polyphenylene ether resin(II) and said film layer(S) comprising a polystyrene resin(III).

22 Claims, 2 Drawing Sheets

LAMINATED FOAM SHEET FOR VEHICLE INTERIOR AND A VEHICLE INTERIOR THEREOF

BACKGROUND OF THE INVENTION

1. Field of the Invention

The present invention relates to a foam sheet for a vehicle interior and more particularly relates to a laminated foam sheet to be used for a vehicle interior such as a headliner having superior characteristics in heat resistance and in lightweight.

2. Description of the Prior Art

So far, as vehicle interior materials, a laminated foamed body comprising a thermoplastic resin foamed body as a base material and a urethane foam laminated on the base material, and a laminated foamed body molded in desired shape using a laminated foam sheet comprising a styrene-maleic anhydride resin foamed layer and styrene-maleic anhydride resin film layers laminated on both side of said foamed layer, have been widely used. These vehicle interior materials have superior characteristics in light weight, heat insulation and its moldability.

However, vehicle interior materials currently used for headliners in particular are insufficient in heat resistance, and thus have a defect of hanging down (heat-sagging) by their weight at the front portion of the molded body and also a defect of deformation, when used for a long time at a high temperature.

In order to solve these problems, a composite material comprising inorganic glass fiber and plastics has been used for a vehicle interior material recently.

However, although this composite material can sustain heat resistance, it still has problems that the weight cannot be reduced, the recycling is difficult due to glass fibers contained and the cost is high.

Therefore, a laminated foam sheet for a headliner, which has light weight and heat resistance, has been proposed [JITSUKAI-HEI-4(1992)-11162)(Unexamined Japanese Utility Model Application)]. It comprises modified polyphenylene ether (PPE) resin foamed layer, both sides of which are laminated with modified polyphenylene ether resin film layer. The laminated foam sheet comprising a modified polyphenylene ether resin is superior in heat resistance and light weight, and thus is considered being capable of improving its deformation and hang-down when subjected to a high temperature.

On the other hand, recently the requirements for cars from heat resistance, light weight, and cost have become severe and therefore, further improvements are necessary in order to meet such requirements in the market. For example, the front portion and the rear portion of a car are sometimes heated to 100° C. or so, when exposed to the sun light resulting in a big deformation. Therefore, there still remains a problem in its heat resistance particularly on the front or rear portion thereof with such above mentioned simple laminated foam sheet using modified polyphenylene ether resin.

SUMMARY OF THE INVENTION

In consideration of above facts, this invention presents a novel headliner having a superior heat resistance and light weight eliminating above mentioned problems, a laminated foam sheet for a headliner and a novel method of manufacturing them easily at a reasonable cost.

In order to provide a headliner having superior heat resistance and light weight which can be manufactured easily at a reasonable cost, the present inventors carried out various studies and found that a high heat resistant modified PPE resin used in the foamed layer can provide the foamed layer with heat resistance, a film layer being laminated on the foamed layer can reduce a residual strain generated at molding, and the resulting laminated foam sheet for a vehicle interior has light weight, high heat resistance(non-thermal deformation), good dimensional stability, good moldability, good shock absorbing property, good sound insulation property, good heat insulation property, and cost competitiveness. Then, the present inventors completed the invention.

Namely this invention comprises:

1. A laminated foam sheet for vehicle interior comprising a foamed core layer, a film layer(P) laminated on one side of said foamed core layer, and a film layer(S) laminated on the other side of said foamed core layer; said foamed core layer comprising modified polyphenylene ether resin(I), said film layer(P) comprising modified polyphenylene ether resin(II) and said film layer(S) comprising a polystyrene resin(III).
2. A laminated foam sheet for vehicle interior as recited in paragraph 1. above, wherein the polystyrene resin(III) is a high-impact polystyrene.
3. A laminated foam sheet for vehicle interior as recited in paragraph 1. above, wherein the polystyrene resin(III) is a heat-resistant polystyrene resin.
4. A laminated foam sheet for vehicle interior as recited in paragraph 1. above, wherein the polystyrene resin(III) comprises an impact-modifier.
5. A laminated foam sheet for vehicle interior as recited in paragraph 1. above, wherein said film layer(P) and/or film layer(S) comprise a flame retardant.
6. A laminated foam sheet for vehicle interior as recited in paragraph 1. above, wherein said modified polyphenylene ether resin(I) comprises polyphenylene ether in an amount not less than 35 weight % and below 75 weight %.
7. A laminated foam sheet for vehicle interior as recited in paragraph 1. above, wherein said modified polyphenylene ether resin (II) of the film layer(P) comprises substantially no rubber content.
8. A laminated foam sheet for vehicle interior as recited in paragraph 1. above, further comprising a hot-melt adhesive layer laminated on said film layer(P).
9. A laminated foam sheet for vehicle interior as recited in paragraph 1. above, wherein a difference in thickness between said film layer(P) and said film layer(S) is provided.
10. A laminated foam sheet for vehicle interior as recited in paragraph 1. above, wherein the sheet is used for a headliner.
11. A vehicle interior made of a laminated foam sheet comprising a foamed core layer, a film layer(P) laminated on one side of said foamed core layer and another film layer(S) laminated on the other side of said foamed core layer; said foamed core layer comprising modified polyphenylene ether resin(I), said film layer(P) comprising modified polyphenylene ether resin(II) and said film layer(S) comprising a polystyrene resin(III); characterized in that said film layer(P) is arranged to face room side.
12. A vehicle interior as recited in paragraph 11. above, wherein the polystyrene resin(III) is a high-impact polystyrene.
13. A vehicle interior as recited in paragraph 11. above, wherein the polystyrene resin(III) is a heat-resistant polystyrene.

14. A vehicle interior as recited in paragraph 11. above, wherein the polystyrene resin(III) comprises an impact-modifier.
15. A vehicle interior as recited in paragraph 11. above, wherein at least one film layer comprises a flame-retardant.
16. A vehicle interior as recited in paragraph 11. above, wherein a phenylene ether content in the polyphenylene ether resin(I) is in an amount of not less than 35 weight % and below 75 weight %, and a styrene content in amount of not less than 25 weight % and below 65 weight %.
17. A vehicle interior as recited in paragraph 11. above, wherein polyphenylene ether resin(II) comprises substantially no rubber content.
18. A vehicle interior as recited in paragraph 11. above, further comprising a hot-melt adhesive layer laminated on said film layer (P).
19. A vehicle interior as recited in paragraph 11. above, wherein a thickness of film layer(P) is different from a thickness of said film layer(S).
20. A vehicle interior as recited in paragraph 19. above, wherein a ratio of the thickness between both film layers is not more than 0.7.
21. A vehicle interior as recited in paragraph 19. above, wherein the film layer arranged room side is thicker than the film layer arranged the other side.
22. A vehicle interior as recited in paragraph 11. above, wherein said vehicle interior is a headliner.

Figure 1:
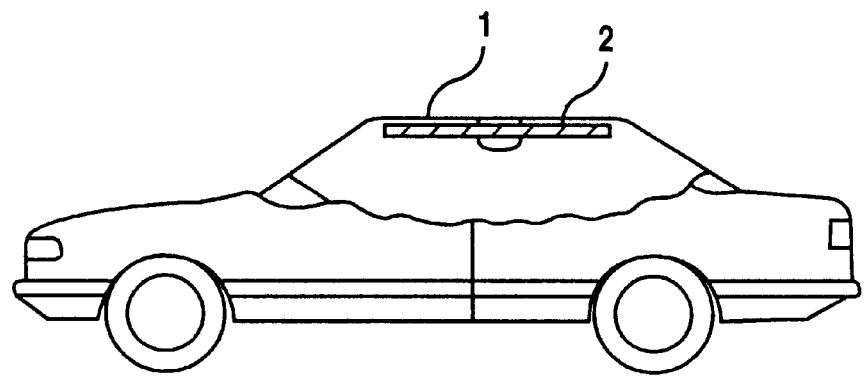
FIG. 1 is a diagram to show the state of the headliner at upper part of the front glass after being mounted to a car.
Figure 2:
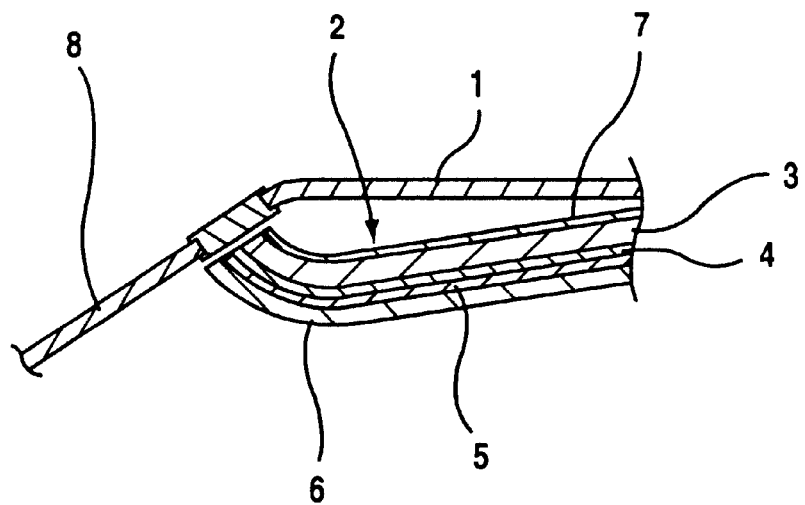
FIG. 2 is a diagram to show the state of the headliner after being mounted to a car.
Figure 3:
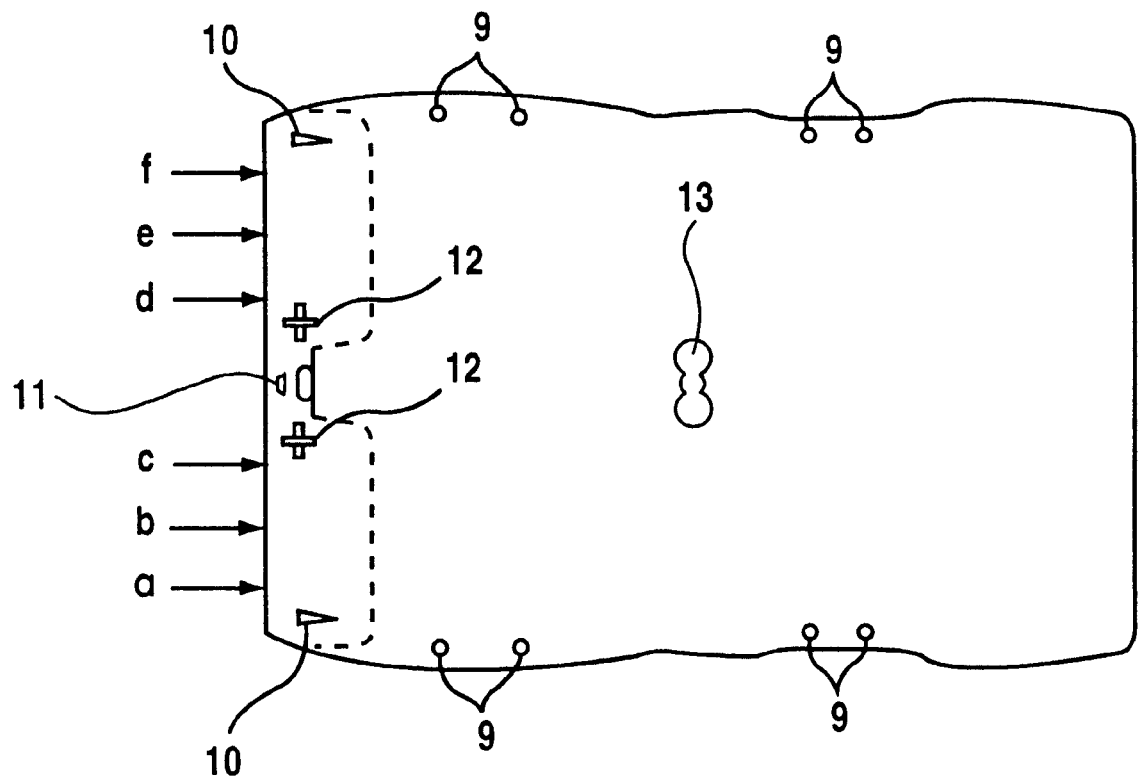
FIG. 3 is a diagram to show a plan view of a headliner after punching and trimming of a molded body in the examples.

Symbols in the figures represent:
1. Roof
2. Headliner
3. Modified polyphenylene ether resin (I) foamed layer
4. Modified polyphenylene ether resin (II) film layer
5. Adhesive layer
6. Decorative layer
7. PS resin (III) film layer
8. Front glass
9. Attaching hole for assist grip
10. Attaching hole for sun visor
11. Attaching hole for room mirror
12. Attaching hole for sun visor stopper
13. Attaching hole for room lamp

DESCRIPTION OF THE PREFERRED EMBODIMENTS

The present invention relates to a laminated primary foamed sheet comprising a modified polyphenylene resin(I) foamed core layer(primary foamed layer) with a modified PPE resin(II) film layer laminated on one side of said foamed core layer and a polystyrene(III) resin film layer laminated on the other side of said foamed core layer.

As shown in FIG. 1, headliner 2 is mounted on an inner surface of car roof 1. In the present invention, the film layer comprised of a modified PPE resin is preferably arranged to face room side.

As mentioned above, modified PPE foamed layer is used as a core layer for the laminated foam sheet for vehicle interior in the present invention. Being composed of a modified PPE resin, this foamed layer is superior in heat resistance and moldability enabling easy production of a laminated foamsheet which is suitable for secondary foam molding. Further, being a foamed layer, it is superior in light weight, sound insulation and heat insulation, and is also advantageous in cost due to smaller amount of resin due to low density.

Modified polyphenylene ether resins are, for example, a mixture of a polyphenylene ether resin (hereinafter called PPE) and a polystyrene resin (hereinafter called PS), a copolymer (hereinafter called PPE-St) such as graft polimerized or block polimerized PPE with a styrene monomer (hereinafter called St), and they can be used in the form of mixtures as follows.

(i) PPE+PS
(ii) PPE-St
(iii) PPE-St+PS
(iv) PPE+PPE-St
(v) PPE+PPE-St+PS

Of these, the mixture(i) of PPE and PS resins is preferred from its easy production.

Phenylene ether monomer content in modified polyphenylene ether resin of the foamed layer is usually not less than 35 weight % and below 75 weight %, preferably below 60 weight %, and the styrene monomer content not less than 25 weight %, preferably not less than 40 weight % and below 65 weight %. When the ratio of phenylene ether monomer content in modified polyphenylene ether resin is too low, the heat resistance tends to become inferior, and when the ratio of phenylene ether monomer content in modified polyphenylene ether resin is too high, the viscosity at thermal fluidization becomes large sometimes making the foam molding difficult.

Examples of the before mentioned PPE resins are poly (2,6 dimethyl-1,4-phenylene ether), poly(2-methyl-6-ethyl-1,4-phenylene ether), poly(2,6-diethyl-1,4-phenylene ether), poly(2-methyl-6-n-propyl-1,4-phenylene ether), poly(2-methyl-6-n-butyl 1,4-phenylene ether), poly(2-methyl 6-chloro-1,4-phenylene ether), poly(2-methyl-6-bromo-1,4-phenylene ether) and poly(2-ethyl-6-chloro-1,4-phenylene ether). These polymers can be used individually or in combinations. Within these examples, poly(2,6-dimethyl-1, 4-phenylene ether) is preferred from the points of the wide uses of the raw materials and the cost. Further in the case which intends to give the fire retarding nature to the resin, poly(2-methyl-6-chloro-1,4-phenylene ether), poly(2-methyl-6-bromo-1,4-phenylene ether) and poly(2-ethyl-6-chloro-1,4-phenylene ether) are preferred.

The examples of the PS resin which comprises a mixture with a PPE resin, are the resin from styrene and its derivative, e.g., α-methyl styrene, 2,4-dimethyl styrene, monochlorostyrene, dichlorostyrene, p-methyl styrene, ethyl styrene. Thus, said PS resin is not only the homopolymer of a styrene or its derivative but also it can be a copolymer with other monomer.

The examples of other monomer copolymerizable with a styrene and its derivative are acrylonitrile, methacrylonitrile, methyl(meth)acrylate, maleic anhydride and itaconic acid, and these are used independently or as a mixture of at least two of them.

Examples of the PS resin are polystyrene, copolymers of α-methylstyrene-styrene, copolymers of styrene-butadiene represented by high impact polystyrene, and copolymers of styrene-acrylonitrile. Among these, polystyrene is preferred from the points of its wide uses and cost.

Examples of the styrene monomers which can polymerize or more preferably graft with the before mentioned PPE resins, are styrene, α-methylstyrene, 2,4-dimethylstyrene, monochlorostyrene, dichlorostyrene, p-methylstyrene and ethylstyrene. A single one or combinations of two or more of these can be used. Among these, styrene is preferred from the point of view of its wide uses and cost.

The St monomer, when copolymerizing with a PPE resin, may contain one or more other monomers which can copolymerize with the St monomer, to the extent that the St monomer can be the major component (not less than 60 weight %). Examples of such other monomers are acrylonitrile, methacrylonitrile, methyl(meth)acrylate, ethyl (meth)acrylate and butyl(meth)acrylate, maleic anhydride and itaconic acid.

The method, which polymerizes a St monomer with before mentioned PPE resins, can be a well known one such as described in TOKUKO-SHO-52(1977)-30991(Published examined Japanese patent application) and TOKUKO-SHO-52(1977)-38596(Published examined Japanese patent application) where the monomer was polymerized during agitation at 130 to 200° C. under the conditions of no water and the existence of an organic solvent or no organic solvent after adding a radical initiator and a styrene monomer to said PPE resins.

The thickness of the primary foamed core layer from the modified PPE used as the base resin is between 1 and 5 mm, more preferably between 1.5 and 3.5 mm, and the expansion rate of it is between 3 and 20, more preferably between 5 and 15, and the average cell diameter of it is between 0.05 and 0.9, more preferably between 0.1 and 0.7 mm, and the ratio of the closed cells is above 70%, more preferably above 80%.

The content of the residual volatile component in the foamed layer is between 1 and 5 weight % of the total weight of the foamed core layer, more preferably between 2 and 4 weight %. The residual content of the volatile component may be measured by gas chromatography, or it is usually measured by weighing the samples before and after heating it at the temperature between the softening point of the modified PPE and the decomposition temperature evaporating the volatile component.

When the thickness of the foamed core layer is smaller than 1 mm, it occurs sometimes that the sheet of the laminated foam layer is not appropriate as a car interior due to lack of strength and heat resistance. While in the case where such thickness is above 5 mm, the moldabilty sometimes becomes worse since the heat cannot transfer into the center in thickness direction of the core layer and the resin cannot be warmed sufficiently during molding. Also in the case that a long heating time is used to provide enough heating, it sometimes becomes difficult to obtain commercially usable products, since the phenomena that the cells in the surface of the core layer may be broken and the like may occur. Also in the case that the expansion ratio in the foamed layer is smaller than 3, the damage of the products by bending easily occurs due to the lack of the flexibility, or it becomes difficult to obtain the light products. In the case that the expansion ratio is over 20, the moldability tends to be less due to the lack of strength and the phenomena that it becomes difficult for the heat to reach the center. Further in the case that the cell diameter is smaller than 0.05 mm, it becomes difficult to obtain sufficient strength, while in the case that the cell diameter is larger than 0.9 mm, the heat resistance tends to be less. Further in the case that the ratio of the closed cells is below 70%, lack of the heat resistance and rigidity occur and the moldability tends to be less since the aimed secondary expansion ratio becomes difficult to be obtained even by heating. Further in the case that the residual weight % of the volatile component is less than 1%, it sometimes becomes difficult to mold in a good manner due to the low expansion ratio in the secondary forming, while in the case of above 5 weight %, air pockets may appear between the film layer and the foamed core layer or the dimensional stability tends to be less as time elapses.

Nuclear agents, impact modifiers, lubricants, antioxidants, antistatic agents, pigments, stabilizers and smell reducing agent can be added to the base resin used in the present invention for the foamed core layer of modified PPE resins(I), if necessary.

A laminated foam sheet for vehicle interior of the present invention comprises a foamed core layer (primary foamed layer) of modified polyphenylene ether resin(I), a film layer(P) of a modified polyphenylene ether resin(II) laminated on one side of said foamed core layer, and a film layer(S) of a polystyrene resin laminated on the other side of said foamed core layer.

As a result of studies by the present inventors, it was found that in case that a residual strain remains in the film layer of a laminated molded article, it causes deformation in the molded article due to relaxation of the strains when disposed to a high temperature (e.g., 100° C.).

For instance, in the case of a headliner, such deformation was observed at the front part. As a countermeasure, the inventors found that the use of a film layer of a PS resin having a heat resistance lower than that of the modified PPE resin of the foamed layer can prevent cell corruption of the foam layer and reduce occurrence of surface roughness and peeling-off of the film layer.

In the present invention, modified PPE resins with high heat resistance are used for the foamed layer and a film layer laminated on the one side thereof. In addition, it is preferred to make a difference in thickness between two film layers laminated on both sides of the foamed layer. It is preferred that the thickness ratio between the two film layers is not more than 0.7. By this, the cooling rates can be balanced between upper and the rear surfaces of the laminated foam sheet coming out of the oven after heating and standing for cooling in the atmosphere before molding.

Like modified PPE resins to be used in the foam layer, modified PPE resins(II) to be used for forming the film layer (P) are, for example, mixtures of a PPE resin and a PS resin, copolymers(PPE-St) such as graft polymerized or block polymerized PPE with a styrene monomer, and they can be used in the form of mixtures: (i) PPE+PS, (ii) PPE-St, (iii) PPE-St+PS, (iv) PPE+PPE-St, (v) PPE+PPE-St+PS.

Of these, the mixture(i) of PPE and PS resins is preferred from its easy production.

The mixing ratio of PPE and St components in the modified PPE resin (II) film layer is preferably in the range of not less than 15 weight % and below 60 weight % of PPE, preferably not less than 30 weight % and below 55 weight % of PPE, and in the range of not less than 40 weight % and below 85 weight % of St, preferably not less than 45 weight % and below 70 weight % of St.

The examples of the PPE resins and its preferred one, the examples of PS resins and its preferred one, the examples of phenyl ether and styrene monomers, the examples of the comonomers which can copolymerize with the St monomers, the amount for use and the reasons of its uses are the same as those for modified PPE resins used in the above-mentioned foamed layer. In case that the PPE content is small, the heat resistance of the molded body tends to be inferior, and in case that the PPE content is large, the extrusion molding sometimes becomes difficult due to increase of the viscosity at the thermal fluidization.

Examples of the modified PPE resins (II), PS resins and St monomers, and the preferred ones are the same as those for the foamed layer. Therefore, the explanations are omitted.

It is preferred that the modified PPE resin (II) for the film layer to be arranged to face room side does not contain a rubber component substantially. If a rubber is contained therein, the elastic modulus is decreased and the heat shrinkage becomes large resulting in bad heat resistance for a headliner. Since a decorative layer is further laminated on room side through a hot melt adhesive layer, there is no cracking problem at trimming even without such rubber component. From above, the modified PPE resin (II) preferably does not contain a rubber component substantially, but may contain it to the extent that above mentioned problems do not occur, for example, in an amount of 3 weight % at most.

Optionally, fillers, lubricants, anti-oxidants, anti-static agents, pigments, stabilizers and smell reducing agent can be added independently or in combination of two or more to above mentioned modified PPE resins (II) for the film layer (P).

Polystyrene resins used in the film layer are resins, the main component (above 60 weight %, preferably above 70 weight %) of which is resin from styrene or its derivative such as $\alpha$-methylstyrene, 2,4-dimethylstyrene, monochlorostyrene, dichlorostyrene, p-methylstyrene and ethylstyrene. Therefore, PS resins contain not only the homopolymers of styrene or its derivatives but also the copolymers which are obtained by copolymerization of styrene or its derivatives with the other comonomer. Further, it can be possible to be a polymer such as the high impact polystyrene obtained by polymerizing styrene or its derivatives under the existence of a synthetic rubber or a gum latex, when polymerized.

Examples of the comonomers which can copolymerize with styrene used in the production of the said polystyrene resins are acrylonitrile, methacrylonitrile, methyl(meth) acrylate, ethyl(meth)acrylate and butyl(meth)acrylate. These can be used individually or in combinations of more than two.

Examples of PS resins, which are used in the film layer, are polystyrene, copolymer of styrene-$\alpha$-methylstyrene, copolymer of styrene-butadiene represented by high impact polystyrene and copolymer of styrene-acrylonitrile, etc. Among these, the polystyrene resin and the high impact polystyrene resin are preferred from the point of view of their wide uses and the cost. The PS resin of great heat resistance are the copolymers of styrene with monomers containing carboxyl groups, the examples of which are copolymers of styrene-maleic anhydride and copolymers of styrene-itaconic acid.

The before mentioned PS resins can be used singly or in combinations of more than two. Further, the PS resins can be blended with other thermoplastics.

Examples of thermoplastics, which can be blended, are polyethylene resins, polypropylene resins, polyethylene terephthalate (PET) resins, polybutylene terephthalate resins, polyamide(nylon) resins, polycarbonate resins, polysulfone resins, polyvinylchloride resins, and polyphenylene ether (PPE) resins. Among these, PPE resins are preferable from its blending property. The content of PPE resins to be blended is usually between 1 and 15 weight %, preferably between 1 and 10 weight %.

In the laminated foam sheet of the present invention, the film layers can be laminated on both sides of it. The thickness of the film layer is in the range of 50 to 300 $\mu$m and 75 to 200 $\mu$m is preferred. In the case that the thickness of the said film layer is thinner than 50 $\mu$m, the strength, rigidity and heat resistance become inferior, and in the case that it is thicker than 300 $\mu$m, the moldability tends to worsen.

Optionally, impact modifiers, fillers, lubricants, anti-oxidants, anti-static agents, pigments, stabilizers and smell reducing agent can be added independently or in combination of two or more to above mentioned polystyrene resins (III) for the film layer (S).

As above mentioned impact modifiers, there is no limit if its effects can manifest by itself, or by mixing or copolymerizing with base resins. In case of high impact polystyrene, for example, it can be used independently for a film layer or in an admixture with a PS resin. As the impact modifiers, a natural rubber, a synthetic rubber and a graft polymer which is obtained by grafting a monomer having olefinic double bond such as styrene, methylmethacrylate and etc. around rubber particles, are preferably used.

Examples of rubbers are styrene-butadiene rubber, hydrogenated styrene-butadiene rubber, butadiene rubber, isoprene rubber, ethylene-propylene rubber, copolymers of ethylene-propylene-diene, copolymers of acrylonitrile-butadiene, chloroprene rubber, butyl rubber, acryl rubber, ethylene-acryl rubber and like. These can be used individually or in combinations of two or more. Among these, styrene-butadiene rubber and hydrogenated styrene-butadiene rubber are preferred from the standpoint of good compatibility with PS resins and the modified PPE resins and its wide uses.

The amount of the impact modifiers is in the range of 2 to 25 weight % of the thermoplastic resins, and especially 5 to 20 weight % are preferred. In the case that the content of the modifiers is below 2 weight %, the improving effects of softening and shock resistance of the film layer cannot be made manifest sufficiently and, as the result, it sometimes occurs that the breakage by bending and a shock cannot be prevented sufficiently. Further, in the case that the content of the modifiers is above 25 weight %, a lack of heat resistance and rigidity may be observed.

The use of organic or inorganic flame retardant for the film layer is effective to improve flame resistance of the molded body from the laminated foam sheet for vehicle interiors of the present invention. Examples of the organic flame retardant are halogenated compounds, phosphate esters and halogenated phosphate esters, and among these, the halogenated compounds are the best from the points of wide uses and cost.

The fillers mentioned before are effective in improving the strength, rigidity, dimensional stability and the like of the molded body, and the kinds of the fillers used are not limited. Examples of the fillers compounded in the film layer are talc(magnesium silicate), calcium carbonate (heavy, light and glue), mica, magnesium oxide, magnesium carbonate, barium sulfate, calcium sulfate, silica, clay, kaolin, white carbon, magnesium hydroxide, carbon black, zeolites, molybdenum and the like. Among these, especially talc, calcium carbonate and mica are preferred.

Optionally, a decorative layer can be further laminated on the film layer of the laminated foam sheet of the present invention.

As the raw materials of the said decorative layer, known materials as the decorative layer materials for car interiors can be used, examples of which include woven cloths and non-woven cloths. These can be the products of synthetic resin such as polyethyleneterephthalate, polypropylene, polyamides (Nylon), polyacrylonitrile, modified polyacrylonitrile(Kanecaron@) and the like, the products of natural material such as wool or cotton and the products of combinations of these. Further, single or multiple foamed layers such as urethane foams, polyolefin foams, e.g., polyethylene and polypropylene foams can be further laminated on these decorative layers.

It is preferred to use the decorative materials to which flame retardant are added, when the headliner of the present invention is required to have a flame retardant characteristics.

Next, the production method of the laminated foam sheet for vehicle interior of the present invention will be explained.

The modified PPE resin foamed core layer (the primary foamed layer) used in the present invention can be produced by the methods comprising: (1) preparing a mixture of PPE and PS resins or a copolymer obtained by grafting or block polymerizing PPE resin with a PS monomer; (2) melting and kneading the resin mixture at a temperature between 150 and 400° C. after adding various additives if necessary; (3) injecting a foaming agent in an amount of from 1 to 15 weight parts against 100 weight parts of the resin under a high temperature of between 150 and 400° C. and a high pressure of between 3 and 50 MPa, and adjusting the temperature to its optimum temperature (between 150 and 300° C.) for foaming; (4) extruding the mixture through circular dies into a low pressure zone(usually atmospheric pressure); and (5) molding the foamed sheet through contact with a mandrel, cutting it into open sheets and winding them up at a rate of between 0.5 and 40 m/min.

Examples of the foaming agents used in producing modified PPE resin foamed core layer are hydrocarbons such as butane, propane, pentane and the like, and halogenated hydrocarbons such as chlorinated methyl, dichloromethane, chlorofluoromethane, dichloroethane, dichlorodifluoroethane and the like. These can be used individually or in combinations of the two or more. Above all, the foaming agents of hydrocarbon are preferred from the points of its wide uses and cost.

The methods of laminating a film layer on the before mentioned primary foamed core layer include: the method of laminating previously formed resin film, for instance with use of heated rolls, on the upper and/or rear surface of the foamed layer being supplied from foaming process; the method of coextruding the film layer and the foamed layer with use of a mutilayer extruder; and the method of laminating resin film being supplied from an extruder on the upper and/or rear surface of previously foamed layer and adhering the film in thermoplastic state thereon with use of a cooling roll for instance. Above all, the inline method for the lamination is preferable, since the production process can be simplified, in which the primary foamed core layer is extruded from an extruder, the film layer is extruded from another extruder, then both materials are combined together.

AS a preferred method for making a foamed body for a vehicle interior such as headliner, there is provided a method comprising the steps; clamping a laminated primary foamed sheet, introducing the sheet to the center of a heating furnace equipped with upper and lower heaters, heating it to a temperature, for example between 120 to 200° C., resulting in the secondary foamed sheet suitable for the subsequent molding step. The laminated secondary foamed sheet is then molded in a mold under temperature control by vacuum or air-aided molding technique.

Examples of vacuum molding and air-aided molding are plug molding, free-drawing molding, plug and ridge molding, ridge molding, matched-mold molding, straight molding, reverse-draw molding, plug assist molding, and plug assist reverse molding. It is preferred to use a mold being comprised of a male and a female dies such as those for plug molding and matched-mold molding, whose temperatures can be controlled.

The molding is preferred to be done, before occurrence of cheloids on the surface of the laminated secondary foamed sheet by heating as mentioned above. According to the studies of the present inventors, the ratio of the closed cell becomes reduced and the lack of the rigidity of the shaped bodies also tends to be reduced, if the molding is done at the condition that the cheloids occur on the sheet surface. The cheloids occur due to breakage of the cells in the foamed core layer resulting in the reduction of the closed cell ratio.

The primary foamed sheet with a foaming ratio between 3 and 20, preferably between 5 and 15 and with a thickness in the range of from 1 to 5 mm, preferably from 1.5 to 3.5 mm is subjected to heat to expand 1.2 to 4.0 times, preferably 1.5 to 3.0 times, resulting in the secondary foamed sheet with a foaming ratio between 3.6 and 60, preferably between 6 and 40 and with a thickness in the range of from 1.2 to 10.0 mm, preferably from 1.8 to 6.2 mm. The average cell size is between 0.1 and 2.0 mm, more preferably between 0.2 and 1.5 mm. The closed cell ratio is above 60%, more preferably above 70%.

When the thickness of the foamed layer of the laminated secondary foamed sheet is below 1.2 mm, it sometimes occurs that the strength and the heat insulation property sometimes become inferior and the sheet is not appropriate for a headliner. In the case of above 10 mm, they are too bulky, narrowing interior space of a car. When the secondary foaming ratio is below 1.2, breakage by bending is likely to occur due to lack of flexibility. In case of the secondary foaming ratio of above 4, the strength tends to decrease. Further when the cell size is below 0.1 mm, it becomes difficult to get enough strength. For above 2.0 mm, the heat insulation tends to become reduced. Further when the closed cell ratio is below 60%, the rigidity sometimes becomes reduced.

Thereby, the vehicle interior material for a headliner of the present invention can be manufactured.

As the methods of producing a laminated foam sheet having a decorative layer for a car interior, there are examples such as, (1)preparing a decorative layer having an adhesive applied beforehand and laminating the decorative layer on the laminated foam sheet using a heating roll, (2)laminating an adhesive layer on a laminated foam sheet by a binder lamination method or by a heat-lamination method using an adhesive previously shaped in a film and combining it with a decorative layer using a heating roll, (3)temporarily binding the laminated foam sheet and the decorative layer and subjecting them to heat for molding and bonding simultaneously, and (4)bonding the decorative layer to the laminated foam sheet simultaneously when the adhesive layer is laminated on the laminated foam sheet.

Examples of the adhesives are thermo-plastic adhesives, hot-melt adhesives, rubber adhesives, thermo-setting adhesives, monomer reactive adhesives, inorganic adhesives, natural adhesives and the like. Among these, the hot melt adhesives are preferred from the point of the easy adhesion.

It is preferred that the decorative layer and the adhesive layer are laminated on the side of modified PPE resin (II) film, since the modified PPE resin (II) has enough rigidity at a high temperature ranging from 80 to 100° C. to control a thermal deformation of the decorative layer.

In the laminated foam sheet of the present invention, it is effective to reduce thermal deformation of the sheet at molding, as a measure of improving heat resistance of the molded body from the foam sheet. More specifically, there is provided a laminated foam sheet and a vehicle interior thereof, e.g., a headliner, comprising a modified PPE resin foam layer, a PS resin film layer laminated on one side of the foam layer and a modified PPE resin film layer laminated on the other side of the foam layer, which has an improved heat resistance and is free from thermal deformation, light weight and cheap in cost.

The following examples are provided as further illustration hereof and are not to be construed as limiting.

In the following examples, the foaming ratio, closed cell ratio and cell size were measured according to the following methods.

(Foaming Ratio)

The reciprocal of apparent density measured in accordance with A-method (water displacement test) in JIS K 7112 titled "Methods for measuring density and specific gravity of plastics"

(Cell Size)

By observing a cross section of a foam through an electron microscope(SEM), number average cell diameter in the width direction was measured.

(Closed Cell Ratio)

Measured according to the method of ASTM D 2856, using multi-pycno meter (product of YUASA AIONICS Co.)

Resins used in the examples and comparative examples are shown in Table 1.

measured and the minimum value for each of the six observation points were recorded after the ceiling part of the car was kept in a permanent temperature room set at 100±1° C. for 24 hours. In the measurement, the hanging up direction was read plus(+) and the hanging down direction was read minus(−).

EXAMPLE 1

To 100 weight parts of a resin mixture comprising 40 weight % of PPE and 60 weight % of PS which was obtained by mixing a modified PPE resin (A) and PS resin (B) in an amount of 72.7 weight % and 27.3 weight %, respectively, were added 2.7 weight parts of a foaming agent, the main component of which was iso-butane (iso/n=85/15), and 0.3 weight parts of talc. The composition was melted and kneaded in a extruder. After cooling to 201° C., the mixture was extruded through a circular die in a sheet and the sheet was wound up on a take-up roll through a pulling up roll at a speed of 8 m/min. The foam sheet obtained had a thickness of 1.6 mm, a foaming ratio of 9 times, a closed cell ratio of 90%, an average cell diameter of 0.15 mm, and a basic weight of 180 g/m$^2$.

A film layer of HIPS (High Impact Polystyrene) (E) having a thickness of 120 $\mu$m was formed on one side of the foamed sheet by melting, kneading and extruding the HIPS resin over the foamed sheet through a T-die at 280° C. of the resin temperature as the foamed sheet was being pulled out from the roll. Subsequently, on the other side of the foamed sheet was laminated a modified PPE resin film layer with the thickness of 120 $\mu$m by extruding the resin from a T-die at 280° C. of the resin temperature over the foamed sheet, said

TABLE 1

| | Product Name | Producers | PPE Content (wt %) | PS Content (wt %) | Rubber Content (wt %) | Other Components (wt %) |
|---|---|---|---|---|---|---|
| Modified PPE resins (A) | Noryl MX-4740 | GE PLASTICS Corp. | 55 | 45 | | |
| PS resins (B) | STYRON G8102 | ASAHI CHEMICAL Corp. | | 100 | | |
| SMA Copolymers (C) | DYLARK 232 | ARCO CHEMICAL. | | 93 | | Maleic Anhydride 7 |
| SMAA Copolymers (D) | | ASAHI CHEMICAL | | 92 | | Methacrylic Acid 8 |
| HIPS (E) | STYRON D475 | ASAHI CHEMICAL | | 94 | 6 | |
| IMPACT MODIFIER (F) | TUFPRENE 125 | ASAHI CHEMICAL | | | 40 | 60 |

Hot-melt films and decorative materials used in the examples and the comparative examples are shown in Table 2.

The molded body was tested for heat resistance in the mounted states as follows.

The headliner [FIG. 1, with a size of 930 mm×1425 mm) was mounted at the ceiling of a car and is fixed through sun visor, room mirror, room lump, garnish, and pillar in the same way as in a real car. The six observation points were marked on the front part of the molded body with an interval of 120 mm symmetrically to the center line of the molded body (a to f in FIG. 1). A bench mark was provided and the vertical distances from the mark were measured. The dimensional variations in vertical direction of the observation points marked on the front part of the molded body were modified PPE resin comprising 30 weight % of PPE and 70 weight % of PS which was obtained by mixing a modified PPE resin (A) and PS resin (B) in an amount of 54.5 weight % and 45.5 weight %, respectively. After that, by pulling out the above-obtained sheet and a hot melt adhesive film (G) at the same time, they were bound on a heat roll being kept at 120° C. at a winding speed of 10 m/min resulting in the laminated foam sheet having a hot melt film.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° c. having a mold clearance of 4.0 mm by a plug molding method. After trimming and punching, a favorable headliner was obtained.

The results of the heat resistance test on the molded bodies obtained are shown in Table 3.

EXAMPLE 2

Using the same foam sheet as the one obtained in example 1, a film layer of HIPS (High Impact Polystyrene) (E) having a thickness of 120 μm was formed on one side of the foamed sheet by melting, kneading and extruding the HIPS resin over the foamed sheet through a T-die at 280° C. of the resin temperature as the foamed sheet was being pulled out from the roll. Subsequently, on the other side of the foamed sheet was laminated a modified PPE resin film layer with the thickness of 120 μm by extruding the resin from a T-die at 280° C. of the resin temperature over the foamed sheet, said modified PPE resin comprising 30 weight % of PPE, 64 weight % of PS and 6 weight % of rubber component which was obtained by mixing a modified PPE resin (A), PS resin (B) and a impact modifier (F), in an amount of 54.5 weight %, 35.5 weight % and 10.0 weight %, respectively.

After that, by pulling out the above-obtained sheet and a hot melt adhesive film (G) from separate rolls at the same time, they were bound on a heat roll being kept at 120° C. and thus the foam sheet laminated with a hot melt film was obtained at a winding speed of 10 m/min.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm in a plug molding method. After trimming and punching, a favorable headliner was obtained.

The results of the heat resistance test on the molded bodies obtained are shown in Table 3.

EXAMPLE 3

Using the same foam sheet as the one obtained in example 1, a film layer of a PS resin of greater heat resistance having a thickness of 120 μm was formed on one side of the foamed sheet, by melting, mixing and extruding the PS resin compositions over the foam sheet through a T-die at 280° C. as the foamed sheet was being pulled out from the roll, said PS resin composition of greater heat resistance comprising 50 wt % of SMA copolymer (C), 40 wt % of PS resin (B) and 10 wt % of an impact modifier (F). Subsequently, on the other side of the foamed sheet was laminated a modified PPE resin film layer with the thickness of 120 μm extruded from a T-die at 280° C. of the resin temperature, said modified PPE resin comprising 30 weight % of PPE, 64 weight % of PS and 6 weight % of rubber component which was obtained by mixing a modified PPE resin (A), PS resin (B) and a impact modifier (F), in an amount of 54.5 weight %, 35.5 weight % and 10.0 weight %, respectively.

After that, by pulling out the above-obtained sheet and a hot melt adhesive film (G) from separate rolls at the same time, they were bound on a heat roll being kept at 120° C. at a winding speed of 10 m/min resulting in the laminated foam sheet with a hot melt film layer.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm by a plug molding method. After trimming and punching, a favorable headliner was obtained.

The results of the heat resistance test on the molded bodies obtained are shown in Table 3.

EXAMPLE 4

Using the same foam sheet as the one obtained in example 1, a film layer of a PS resin of greater heat resistance having a thickness of 120 μm was formed on one side of the foamed sheet, by melting, kneading and extruding the PS resin compositions over the foam sheet through a T-die at 280° C. as the foamed sheet was being pulled out from the roll, said PS resin composition comprising 90 wt % of SMA copolymer (D) and 10 wt % of an impact modifier (F). Subsequently, on the other side of the foamed sheet was laminated a modified PPE resin film layer with the thickness of 120 μm extruded from a T-die at 280° C. of the resin temperature, said modified PPE resin comprising 30 weight % of PPE, 64 weight % of PS and 6 weight % of rubber component which was obtained by mixing a modified PPE resin (A), PS resin (B) and a impact modifier (F), in an amount of 54.5 weight %, 35.5 weight % and 10.0 weight %, respectively.

After that, by pulling out the above-obtained sheet and a hot melt adhesive film (G) from separate rolls at the same time, they were bound on a heat roll being kept at 120° C. at a winding speed of 10 m/min resulting in the laminated foam sheet with a hot melt film layer.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm by a plug molding method. After trimming and punching, a favorable headliner was obtained.

The results of the heat resistance test on the molded bodies obtained are shown in Table 3.

EXAMPLE 5

Using the same foam sheet as the one obtained in example 1, a film layer of HIPS (High Impact Polystyrene) (E) having a thickness of 80 μm was formed on one side of the foamed sheet by melting, kneading and extruding the HIPS resin over the foamed sheet through a T-die at 280° C. of the resin temperature as the foamed sheet was being pulled out from the roll. Subsequently, on the other side of the foamed sheet was laminated a modified PPE resin film layer with the thickness of 120 μm by melting, kneading and extruding the modified PPE resin over the foamed sheet from a T-die at 280° C. of the resin temperature, said modified PPE resin comprising 30 weight % of PPE, 64 weight % of PS and 6 weight % of rubber component which was obtained by mixing a modified PPE resin (A), PS resin (B) and a impact modifier (F), in an amount of 54.5 weight %, 35.5 weight % and 10.0 weight %, respectively.

After that, by pulling out the above-obtained sheet and a hot melt adhesive film (G) from separate rolls at the same time, they were bound on a heat roll being kept at 120° C. at a winding speed of 10 m/min resulting in the laminated foam sheet with a hot melt film layer.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm by a plug molding method. After trimming and punching, a favorable headliner was obtained.

The results of the heat resistance test on the molded bodies obtained are shown in Table 3.

EXAMPLE 6

To 100 weight parts of a modified PPE resin (A) were added 2.7 weight parts of a foaming agent and 0.3 weight parts of tarc, wherein said modified PPE resin (A) comprises 55 wt % of a PPE resin component and said foaming agent comprises iso-butane as a main component (iso/n=85/15). The composition was melted and kneaded in a extruder. After cooling to 215° C., the mixture was extruded through a circular die in a sheet and the sheet was wound up on a take-up roll through a pulling up roll at a speed of 8 m/min. The foam sheet obtained had a thickness of 1.6 mm, a foaming ratio of 9 times, a closed cell ratio of 90%, an average cell diameter of 0.15 mm, and a basic weight of 180 g/m$^2$.

A film layer of HIPS (High Impact Polystyrene) (E) having a thickness of 120 μm was formed on one side of the above-obtained foamed sheet by the methods comprising melting and kneading the HIPS resin, and extruding it over the foamed sheet through a T-die at 280° C. of the resin temperature as the foamed sheet was being pulled out from the roll. Subsequently, on the other side of the foamed sheet was laminated a modified PPE resin film layer with the thickness of 120 μm by extruding the resin from a T-die at 280° C. of the resin temperature over the foamed sheet, said modified PPE resin comprising 30 weight % of PPE and 70 weight % of PS which was obtained by mixing a modified PPE resin (A) and PS resin (B) in an amount of 54.5 weight % and 45.5 weight %, respectively.

After that, by pulling out the above-obtained sheet and a hot melt adhesive film (G) from separate rolls at the same time, they were bound on a heat roll being kept at 120° C. at a winding speed of 10 m/min and thus the foam sheet laminated with a hot melt film was obtained.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm by a plug molding method. After trimming and punching, a favorable headliner was obtained.

The results of the heat resistance test on the molded bodies obtained are shown in Table 3.

Comparative Example 1

Using the same foam sheet as the one obtained in example 1, a film layer of HIPS (E) having a thickness of 120 μm was formed on one side of the foamed sheet by the methods of melting, kneading and extruding the HIPS resin over the foamed sheet through a T-die at 280° C. of the resin temperature. Subsequently, on the other side of the foamed sheet was laminated another HIPS (E) resin film layer with the thickness of 120 μm by extruding the resin from a T-die at 280° C. of the resin temperature over the foamed sheet, resulting in a laminated foam sheet comprising non-foamed film layers laminated on both sides of the foamed core layer.

After that, by pulling out the above-obtained sheet and a hot melt adhesive film (G) from separate rolls at the same time, they were bound on a heat roll being kept at 120° C. at a winding speed of 10 m/min resulting in a laminated foam sheet having a hot melt film layer.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm by a plug molding method. After trimming and punching, a favorable headliner was obtained.

The results of the heat resistance test on the molded bodies obtained are shown in Table 3.

Comparative Example 2

Using the same foam sheet as the one obtained in example 1, on one side of the foam sheet was formed a modified PPE resin film layer with the thickness of 120 μm by melting, kneading and extruding the resin from a T-die at 280° C. of the resin temperature over the foamed sheet, wherein said modified PPE resin comprises 30 weight % of PPE, 64 weight % of PS and 6 weight % of rubber component which was obtained by mixing a modified PPE resin (A), PS resin (B) and a impact modifier (F), in an amount of 54.5 weight %, 35.5 weight % and 10.0 weight %, respectively.

Similarly, on the other side of the foam sheet was formed a modified PPE resin film layer with the thickness of 120 μm by melting, kneading and extruding the resin from a T-die at 280° C. of the resin temperature over the foamed sheet, wherein said modified PPE resin comprises 30 weight % of PPE, 64 weight % of PS and 6 weight % of rubber component which was obtained by mixing a modified PPE resin (A), PS resin (B) and a impact modifier (F), in an amount of 54.5 weight %, 35.5 weight % and 10.0 weight %, respectively, resulting in a laminated foam sheet having non-foamed film layers laminated on both sides of the foam.

After that, by pulling out the above-obtained sheet and a hot melt adhesive film (G) from separate rolls at the same time, they were bound on a heat roll being kept at 120° C. at a winding speed of 10 m/min resulting in a laminated foam sheet having a hot melt film layer.

Then, a decorative material(H) was temporarily bound to the surface of hot melt adhesive layer of the above-obtained laminated foam sheet. The temporarily bound sheet was clamped at the four sides, heated in a oven for 30 seconds until the surface temperature reached 135° C., and then molded in a mold held at 20° C. having a mold clearance of 4.0 mm by a plug molding method. After trimming and punching, a favorable headliner was obtained.

The results of the heat resistance test on the molded bodies obtained are shown in Table 3.

TABLE 2

|  | Producers | Grades | thickness (μm) | Remarks |
| --- | --- | --- | --- | --- |
| Hot Melt Films (G) | KURABO | X-2200 | 70 | Polyethylene resin |
| Decorative Layer (H) | TOYOBO | RH-95-300 | about 1000 | Polyester resin non-woven web |

TABLE 3

| | Foamed Core Layer PPE Content | Film Layer | | | | | | Variation by the heat resistance test (mm) |
|---|---|---|---|---|---|---|---|---|
| | | Room side | | | Roof side | | | |
| | | PPE Content (weight %) | Rubber content (weight %) | Thickness (μm) | Resins | Rubber Content (weight %) | Thickness (μm) | |
| Example 1 | 40 | 30 | 0 | 120 | HIPS | 6 | 120 | −1.2 |
| Example 2 | 40 | 30 | 6 | 120 | HIPS | 6 | 120 | −2.5 |
| Example 3 | 40 | 30 | 6 | 120 | SMA Copolymer + PS | 6 | 120 | −1.8 |
| Example 4 | 40 | 30 | 6 | 120 | SMAA Copolymer | 6 | 120 | −2.0 |
| Example 5 | 40 | 30 | 6 | 120 | HIPS | 6 | 80 | 0.5 |
| Example 6 | 55 | 30 | 0 | 120 | HIPS | 6 | 120 | −1.0 |
| Comparative Example 1 | 40 | 0 | 6 | 120 | HIPS | 6 | 120 | −12.0 |
| Comparative Example 2 | 40 | 30 | 6 | 120 | Modified PPE resin PPE content: 30 wt % | 6 | 120 | −4.5 |

What we claim is:

1. A laminated foam sheet for vehicle interior comprising
a foamed core layer,
a film layer(P) laminated on one side of said foamed core layer, and
a film layer(S) laminated on the other side of said foamed core layer;
said foamed core layer comprising a modified polyphenylene ether resin(I),
said film layer(P) comprising a modified polyphenylene ether resin(II) and
said film layer(S) comprising a polystyrene resin(III).

2. A laminated foam sheet for vehicle interior as recited in claim 1, wherein the polystyrene resin(III) is a high-impact polystyrene.

3. A laminated foam sheet for vehicle interior as recited in claim 1, wherein the polystyrene resin(III) is a heat-resistant polystyrene resin.

4. A laminated foam sheet for vehicle interior as recited in claim 1, wherein the polystyrene resin(III) comprises an impact modifier.

5. A laminated foam sheet for vehicle interior as recited in claim 1, wherein said film layer(P) and/or film layer(S) comprise a flame retardant.

6. A laminated foam sheet for vehicle interior as recited in claim 1, wherein said modified polyphenylene ether resin(I) comprises polyphenylene ether in an amount not less than 35 weight % and below 75 weight %.

7. A laminated foam sheet for vehicle interior as recited in claim 1, wherein said modified polyphenylene ether resin (II) of the film layer(P) comprises substantially no rubber content.

8. A laminated foam sheet for vehicle interior as recited in claim 1, further comprising a hot-melt adhesive layer laminated on said film layer(P) on a side of said film layer (P) which is opposite said film layer (S).

9. A laminated foam sheet for vehicle interior as recited in claim 1, wherein a thickness of said film layer(P) is different from a thickness of said film layer(S).

10. A laminated foam sheet for vehicle interior as recited in claim 1, wherein the sheet is used for a headliner.

11. A vehicle interior made of a laminated foam sheet comprising
a foamed core layer,
a film layer(P) laminated on one side of said foamed core layer, and
another film layer(S) laminated on the other side of said foamed core layer;
said foamed core layer comprising a modified polyphenylene ether resin(I),
said film layer(P) comprising a modified polyphenylene ether resin(II) and
said film layer(S) comprising a polystyrene resin(III);
said film layer(P) being arranged to face a room side of said vehicle interior.

12. A vehicle interior as recited in claim 11, wherein the polystyrene resin(III) is a high-impact polystyrene.

13. A vehicle interior as recited in claim 11, wherein the polystyrene resin(III) is a heat-resistant polystyrene.

14. A vehicle interior as recited in claim 11, wherein the polystyrene resin(III) comprises an impact-modifier.

15. A vehicle interior as recited in claim 11, wherein at least one of said film layers comprises a flame-retardant.

16. A vehicle interior as recited in claim 11, wherein a phenylene ether content in said modified polyphenylene ether resin(I) is in an amount of not less than 35 weight % and below 75 weight %, and a styrene content in said modified polyphenylene ether resin(I) is in amount of not less than 25 weight % and below 65 weight %.

17. A vehicle interior as recited in claim 11, wherein said modified polyphenylene ether resin(II) comprises substantially no rubber content.

18. A vehicle interior as recited in claim 11, further comprising a hot-melt adhesive layer laminated on said film layer (P) on a side of said film layer(P) which is opposite said film layer(S).

19. A vehicle interior as recited in claim 11, wherein a thickness of said film layer(P) is different from the thickness of said film layer(S).

20. A vehicle interior as recited in claim 19, wherein a ratio of the thickness of one of said film layers to the thickness of the other of said film layers is not more than 0.7.

21. A vehicle interior as recited in claim 19, wherein the film layer(P) is thicker than the film layer(S).

22. A vehicle interior as recited in claim 11, wherein said vehicle interior is a headliner.

* * * * *